US007690738B2

(12) United States Patent
Wilt

(10) Patent No.: US 7,690,738 B2
(45) Date of Patent: Apr. 6, 2010

(54) DYNAMICALLY CHANGING TRACK SUPPORT FOR TRACKED VEHICLE

(76) Inventor: H. William B. Wilt, P.O. Box 1665, Valleyview, AB (CA) T0H 3N0

(*) Notice: Subject to any disclaimer, the term of this patent is extended or adjusted under 35 U.S.C. 154(b) by 0 days.

(21) Appl. No.: 11/915,844

(22) PCT Filed: May 31, 2006

(86) PCT No.: PCT/CA2006/000880

§ 371 (c)(1),
(2), (4) Date: Nov. 28, 2007

(87) PCT Pub. No.: WO2006/128284

PCT Pub. Date: Dec. 7, 2006

(65) Prior Publication Data

US 2008/0211299 A1   Sep. 4, 2008

Related U.S. Application Data

(60) Provisional application No. 60/686,063, filed on May 31, 2005.

(51) Int. Cl.
  B62D 55/00   (2006.01)
  B62D 55/116  (2006.01)
  B62D 55/104  (2006.01)

(52) U.S. Cl. .................. 305/133; 305/130; 305/144; 305/150

(58) Field of Classification Search .............. 305/44, 305/60, 120, 124, 126, 128, 129, 130, 132, 305/133, 134, 135, 141, 143, 144, 150, 15; 180/9.1, 9.44, 9.46, 9.48, 9.5, 9.52
See application file for complete search history.

(56) References Cited

U.S. PATENT DOCUMENTS

| 279,652 | A | 6/1883 | Kilcullen |
| 3,057,319 | A | 10/1962 | Wagner |
| 3,231,290 | A | 1/1966 | Weyer |
| 3,276,531 | A | 10/1966 | Hale |
| 3,529,688 | A | 9/1970 | Bruce |
| 3,533,483 | A | 10/1970 | Ballinger |

(Continued)

FOREIGN PATENT DOCUMENTS

| BE | 906105 | 4/1987 |
| FR | 2817806 | 6/2002 |
| JP | 57155171 | 9/1982 |

(Continued)

Primary Examiner—S. Joseph Morano
Assistant Examiner—Kip T Kotter
(74) Attorney, Agent, or Firm—Christensen O'Connor Johnson Kindness PLLC

(57) ABSTRACT

A dynamically changing track support for a tracked vehicle, includes a body with one or more track engaging wheels mounted for rotation to the body and extending above the top of the body and below the bottom of the body. At least two arms are provided. Each arm has a body engaging end and a track engaging end. The track engaging ends of the arm extends outwardly past the body. The body engaging end is pivotally secured to the body for pivotal movement about a substantially horizontal pivot axis. One or more track engaging wheels are mounted for concentric axial rotation about an axle positioned at the track engaging end of the each arm. Dynamically adjustment of the pivotal positioning of the arms relative to the body results in changes to track geometry while maintaining consistent tension.

7 Claims, 5 Drawing Sheets

U.S. PATENT DOCUMENTS

| | | | | |
|---|---|---|---|---|
| 3,841,424 A | * | 10/1974 | Purcell et al. | 180/9.5 |
| 3,934,664 A | | 1/1976 | Pohjola | |
| 4,119,163 A | | 10/1978 | Ball | |
| 4,483,407 A | | 11/1984 | Iwamoto | |
| 4,709,773 A | | 12/1987 | Clement | |
| 5,076,378 A | | 12/1991 | Lagacé | |
| 5,148,882 A | | 9/1992 | Carra | |
| 5,316,381 A | * | 5/1994 | Isaacson et al. | 305/145 |
| 5,452,949 A | * | 9/1995 | Kelderman | 305/129 |
| 5,515,935 A | | 5/1996 | Lagacé | |
| 5,515,936 A | | 5/1996 | Lagacé | |
| 5,622,234 A | | 4/1997 | Nagorcka | |
| RE36,284 E | * | 8/1999 | Kelderman | 305/129 |
| 6,132,287 A | | 10/2000 | Kuralt | |
| 6,155,363 A | | 12/2000 | Matsumoto | |
| D556,791 S | * | 12/2007 | Brazier et al. | D15/28 |
| 2004/0140138 A1 | | 7/2004 | Brazier | |

FOREIGN PATENT DOCUMENTS

| | | |
|---|---|---|
| JP | 05286460 A * | 11/1993 |
| JP | 9240526 | 9/1997 |
| JP | 10218045 | 8/1998 |
| WO | WO 03029070 A1 * | 4/2003 |

\* cited by examiner

DYNAMICALLY CHANGING TRACK SUPPORT FOR TRACKED VEHICLE

FIELD OF THE INVENTION

The present invention relates to a track support for a tracked vehicle, which dynamically changes configuration.

BACKGROUND OF THE INVENTION

U.S. Pat. No. 4,932,831 (White et al 1990) entitled "All Terrain Mobile Robot" is an example of a track support that dynamically changes configuration.

SUMMARY OF THE INVENTION

There is provided a dynamically changing track support for a tracked vehicle, which includes a body having a first side, a second side, a top and a bottom. At least one track engaging wheel is mounted for concentric axial rotation about at least one axle supported by the body. The at least one track engaging wheel extends above the top of the body and extends below the bottom of the body. At least two arms are provided including a first arm and a second arm. The first arm has a body engaging end and a track engaging end. The track engaging end of the first arm extends outwardly past the first side of the body. The body engaging end is pivotally secured to the body for pivotal movement about a first substantially horizontal pivot axis. At least one track engaging wheel is mounted for concentric axial rotation about an axle positioned at the track engaging end of the first arm. The second arm has a body engaging end and a track engaging end. The track engaging end of the second arm extends outwardly past the second side of the body. The body engaging end is pivotally secured to the body for pivotal movement about a second substantially horizontal pivot axis. At least one track engaging wheel is mounted for concentric axial rotation about an axle positioned at the track engaging end of the second arm. Means are provided for dynamically adjusting the pivotal positioning of the first arm and the second arm relative to the body to change track geometry while maintaining consistent tension.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
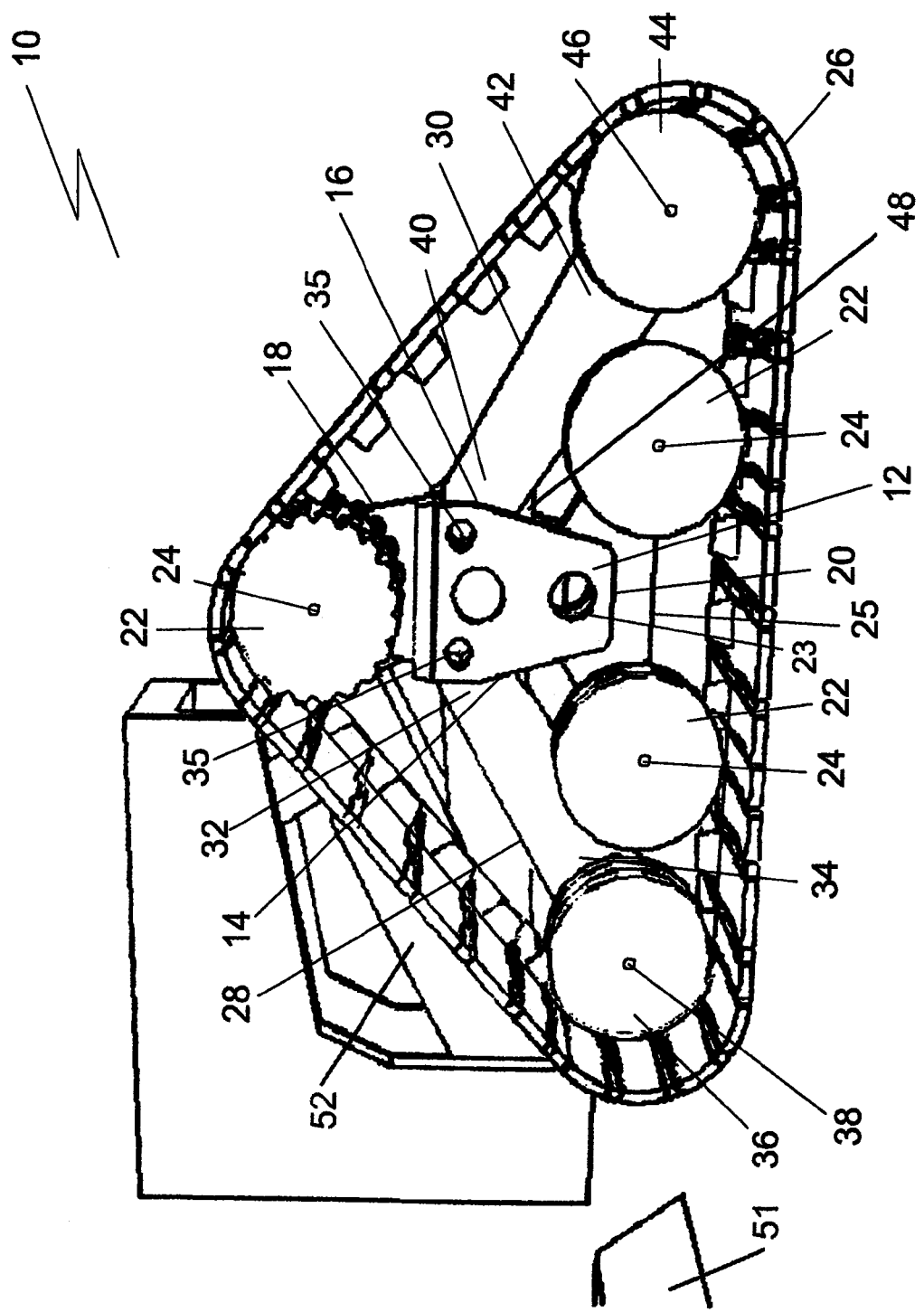
FIG. 1 is a side elevation view of a dynamically changing track support with the arms down.

The preferred embodiment, a dynamically changing track support for a tracked vehicle generally identified by reference numeral 10, will now be described with reference to FIG. 1 through 5.

Structure and Relationship of Parts:

Referring now to FIG. 1, dynamically changing track support 10, includes a body 12 having a first side 14, a second side 16, a top 18 and a bottom 20. Body 12 supports several track engaging wheels 22 mounted for concentric axial rotation about axles 24. Track engaging wheels 22 extend both above top 18 of body 12 and below bottom 20 of body 12. Track engaging wheels 22 at bottom 20 are carried by a walking beam 25 which is pivotally secured to body 12 for pivotal movement about a substantially horizontal pivot axis 23. Walking beam 25 may be adapted to allow for a small amount of movement when traversing small-scale obstacles, to provide suspension similar to that in other tracked vehicles.

Figure 2:
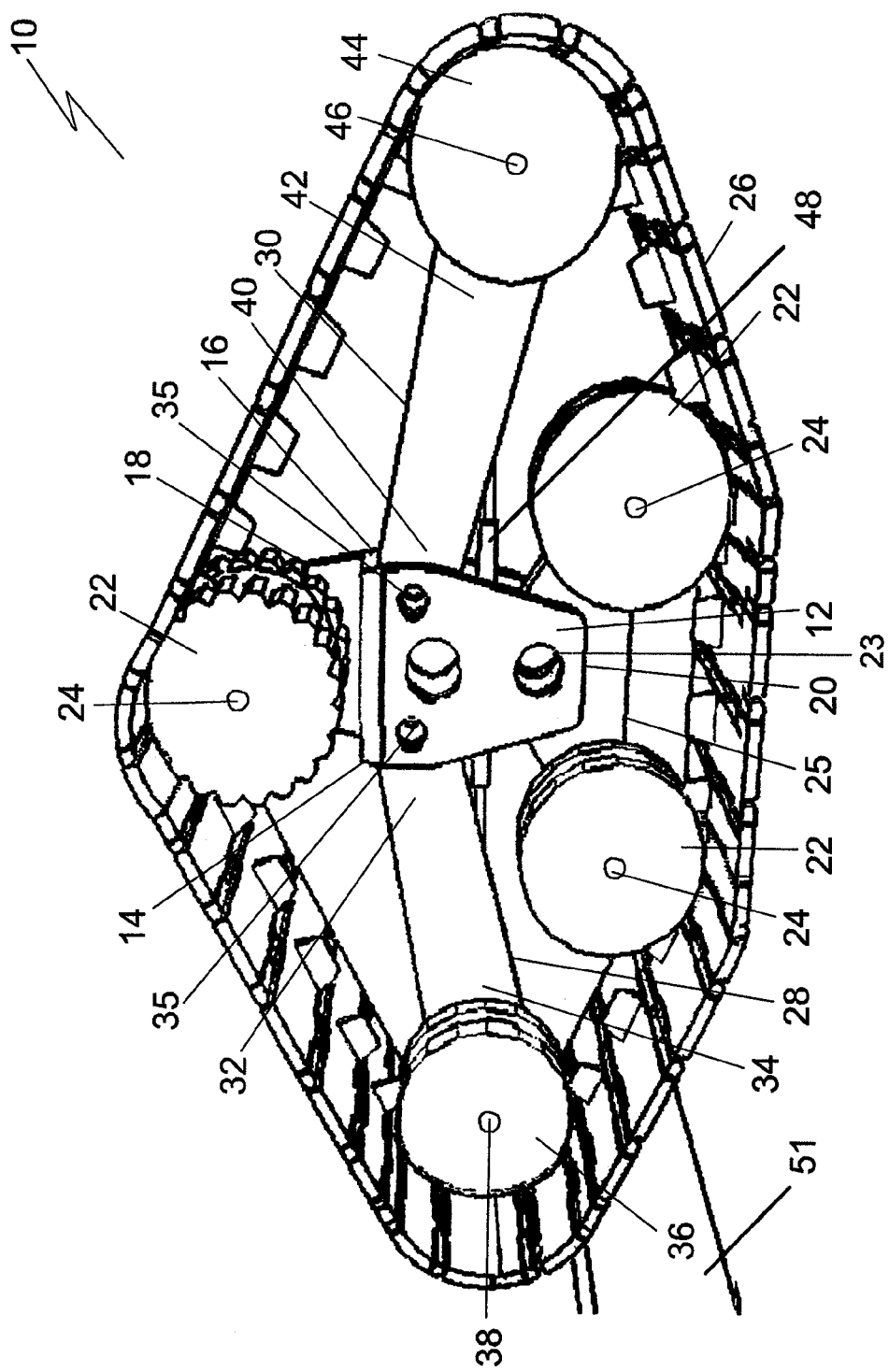
FIG. 2 is a side elevation view of the dynamically changing track support with telescopic actuators engaged.
Figure 3:
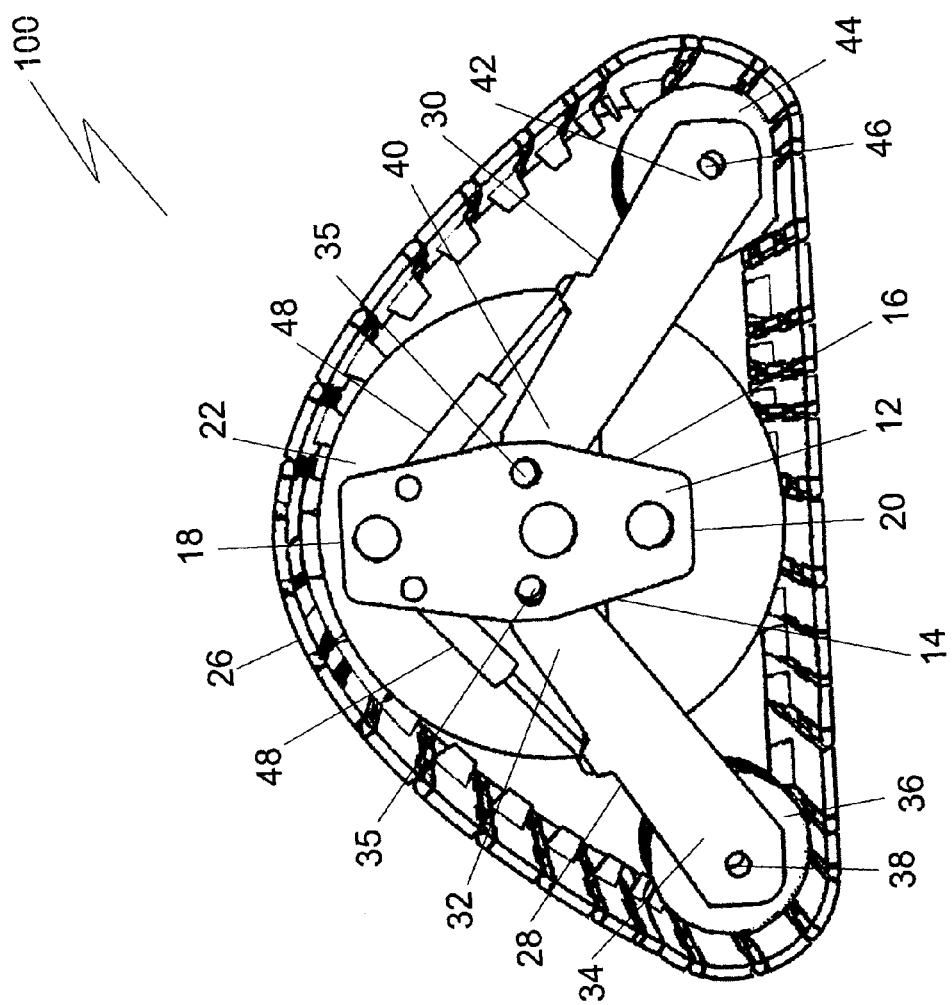
FIG. 3 is a side elevation view of an alternative embodiment of dynamically changing track support.

Referring to FIGS. 1 and 2, to allow the track 26 to be dynamically adjusted, there are two arms provided (although more may be present), including a first arm 28 and a second arm 30. First arm 28 has a body engaging end 32 and a track engaging end 34. Track engaging end 34 of first arm 28 extends outwardly past first side 14 of body 12, and body engaging end 32 is pivotally secured to body 12 for pivotal movement about a first substantially horizontal pivot axis 35. There is a track engaging wheel 36 (although more than one may be present) mounted for concentric axial rotation about an axle 38 positioned at track engaging end 34 of first arm 28. Second arm 30 also has a body engaging end 40 and a track engaging end 42 similar to first arm 28, with a track engaging wheel 44 mounted for concentric axial rotation about an axle 46 positioned at track engaging end 42 of second arm 30. As shown, second arm 30 extends outwardly past second side 16 of body 12 a like distance to that which first arm 28 extends outwardly past first side 14 of body 12 to provide a symmetrical arm configuration. As shown in FIG. 3, the preferred means for dynamically adjusting the pivotal positioning of first arm 28 and second arm 30 relative to body 12 to change the geometry of track 26 while maintaining consistent tension, are hydraulic cylinders which act as telescopic actuators 48. It will be noted that, while only two positions are shown in FIGS. 1 and 2, other positions are also available.

Figure 4:
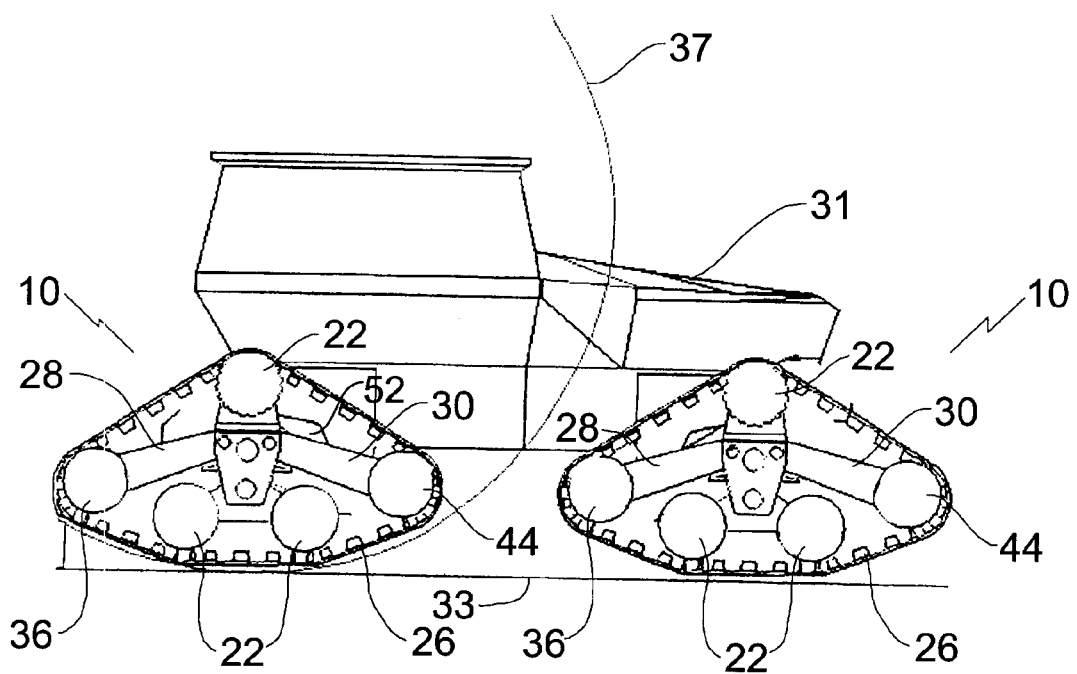
FIG. 4 is a side elevation view of an alternative embodiment of dynamically changing track support.
Figure 5:
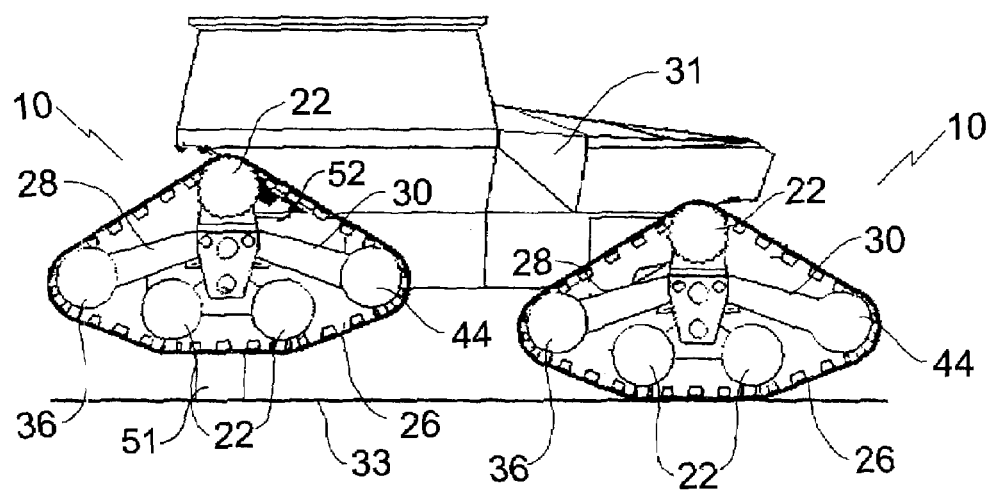
FIG. 5 is a side elevation view of the alternative embodiment of dynamically changing track support illustrated in FIG. 12 operating on a suspension system.

In the preferred embodiment, first arm 28 and second arm 30 are held positively in place. However, in response to the conditions under which the tracked vehicle 31 is used, first arm 28 and second arm 30 may be adjusted dynamically during operation, or prior to operation. In the lowered position shown in FIG. 1, track 26 is able to maximize its contact with the ground 33, and has the benefits that exist for other tracked vehicles, such as less pressure on the ground 33 to leave a smaller footprint, and a greater ability to get through soft ground, mud, sand, or the like. Referring to FIG. 4, in a raised position, track 26 acts more like a tire with a large circumferential radius than a track, represented by circle 37, and thus has the benefits that exist for a tire with a large circumferential radius, such as the ability to overcome large-scale obstacles 51, and inflicting less damage on the ground 33 than a track when making a sharp turn. In one embodiment, there may be a controller which detects when a sharp turn is being made and automatically raises arms 28 and 30. Referring to FIG. 5, it is preferred that track support 10 be connected to a suspension system 52 which allows it to move vertically when overcoming obstacles, to maintain a certain level of vehicle stability. While it may also be possible to have track support 10 pivot about an axis to overcome obstacles, this would cause vehicle 31 to lurch as it did so. In addition, when encountering obstacles like stumps in soft surroundings like snow, or obstacles tilted at a negative angle, pivoting would allow the track support 10 to dig itself down instead of clearing the obstacle. This is especially the case when arms 28 and 30 are in the down position shown in FIG. 1.

The pivotal position is dynamically adjusted by telescopic actuators 48 provided between body 12 and each of the first arm 28 and the second arm 30. The dynamic adjustment of the pivotal positioning of first arm 28 and second arm 30 relative to body 12 is in response to pressure applied by telescopic actuators 48. As first arm 28 and second arm 30 are raised or lowered, minor adjustments to the length of arms 28 and 30, or the position of wheel 22 that extends above top 18 of body 12 may be necessary to maintain the appropriate track tension. These adjustments may be made using track tensioning arrangements that exist on other tracked vehicles. However, if the variation shown in FIG. 3 is used, where one track engaging wheel 22 replaces the three wheels 22 used in FIGS. 1 and 2, these adjustments may not be necessary because the points of contact reside on concentric arcs during the entire dynamic cycle. Tension requirements would still arise as a result of a change in temperature due to different in coefficients of expansion, or component size changes due to wear. Track tension will be maintained with minor adjustments required as long as track 26 engages wheels 22. However, it may be desired to reduce track tension 26, such as when a track 26 needs to be removed, or installed. In that situation, arms 28 and 30 are raised or lowered to a position such that track 26 no longer engages wheels 22 either on the top or bottom.

Referring to FIG. 3, another feature that may be desired is to have wheel 22 made from rubber, such that, if track 26 were to break during operation, vehicle 31 could still be driven to a more convenient location. In the embodiment shown in FIGS. 1 and 2, it would be necessary to change gear ratios if this were to occur since the effective diameter of track 26 is much larger than the diameter of driving wheels 22. However, the gear ratios would not have to be changed if the embodiment in FIG. 3 were used, since the diameters are the same.

Operation:

The use and operation of dynamically changing track support 10 will now be described with reference to FIG. 1 through 5. Referring to FIG. 1, first arm 28 and second arm 30 are maintained in a lowered position by positive pressure as track support 10 approaches an obstacle or a sharp turn. Referring to FIG. 2, as track support 10 reaches an obstacle or a sharp turn, first arm 28 and second arm 30 are raised about pivot axis 35 in response to pressure exerted by the telescopic actuators 48. When negotiating a sharp turn, first arm 28 and second arm 30 may be raised by an operator, or automatically based on readings from a sensor.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A dynamically changing track support for a tracked vehicle, comprising:

a body having a first side, a second side, a top and a bottom;

more than one centrally positioned weight bearing track engaging wheels that are mounted for concentric axial rotation about at least one axle supported by the body, including at least one centrally positioned track engaging wheel extending above the top of the body and at least one centrally positioned track engaging wheel extending below the bottom of the body;

at least two arms, including a first arm and a second arm;

the first arm having a body engaging end and a track engaging end, the track engaging end of the first arm extending outwardly past the first side of the body, with the body engaging end pivotally secured to the body for pivotal movement about a first substantially horizontal pivot axis;

a first track tensioning wheel mounted for concentric axial rotation about an axle positioned at the track engaging end of the first arm;

the second arm having a body engaging end and a track engaging end, the track engaging end of the second arm extending outwardly past the second side of the body with the body engaging end pivotally secured to the body for pivotal movement about a second substantially horizontal pivot axis, the second arm extending outwardly past the second side of the body a like distance to that which the first arm extends outwardly past the first side of the body, providing a symmetrical arm configuration;

a second track tensioning wheel mounted for concentric axial rotation about an axle positioned at the track engaging end of the second arm; and means for dynamically adjusting the pivotal positioning of the first arm and the second arm relative to the body to change track geometry including raising the first arm and the second arm to lift the first track tensioning wheel and the second track tensioning wheel to reduce the amount of track in ground contact in anticipation of a turn or by lowering the first arm and the second arm to increase the amount of track in ground contact in anticipation of travelling on environmentally sensitive ground.

2. The dynamically changing track support for a tracked vehicle as defined in claim 1, wherein telescopic actuators are provided between the body and each of the first arm and the second arm for dynamically adjusting the pivotal positioning of the first arm and the second arm relative to the body.

3. The dynamically changing track support for a tracked vehicle as defined in claim 1, wherein there is a single centrally positioned track engaging wheel extending above the top of the body and a walking beam pivotally secured to the body for pivotal movement about a fixed substantially horizontal pivot axis that carries a pair of centrally positioned track engaging wheels extending below the bottom of the body.

4. The dynamically changing track support of a tracked vehicle as defined in claim 1, wherein the first arm and the second arm are raised by separately operable telescopic actuators in anticipation of overcoming a large obstacle.

5. The dynamic changing track support of a tracked vehicle as defined in claim 1, wherein the at least one track engaging wheel is composed of a rubber-based material to allow the tracked vehicle to operate without a track.

6. The dynamic changing track support of a tracked vehicle as defined in claim 1, wherein the body is mounted to a suspension system that allows substantially vertical movement.

7. A dynamically changing track support for a tracked vehicle, comprising:

a body having a first side, a second side, a top and a bottom;

a single centrally positioned track engaging wheel mounted for concentric axial rotation about an axle supported by the body, the single centrally positioned track engaging wheel extending above the top of the body in engagement with a track;

a walking beam pivotally secured to the body for pivotal movement about a fixed substantially horizontal pivot axis that carries a pair of centrally positioned track engaging wheels extending below the bottom of the body in engagement with the track;

a first arm having a body engaging end and a track engaging end, the track engaging end of the first arm extending outwardly past the first side of the body, with the body engaging end pivotally secured to the body for pivotal movement about a first substantially horizontal pivot axis;

a first track tensioning wheel mounted for concentric axial rotation about an axle positioned at the track engaging end of the first arm;

a second arm having a body engaging end and a track engaging end, the track engaging end of the second arm extending outwardly past the second side of the body with the body engaging end pivotally secured to the body for pivotal movement about a second substantially horizontal pivot axis, the second arm extending outwardly past the second side of the body a like distance to that which the first arm extends outwardly past the first side of the body, providing a symmetrical arm configuration;

a second track tensioning wheel mounted for concentric axial rotation about an axle positioned at the track engaging end of the second arm;

a first telescopic actuator for dynamically adjusting the pivotal positioning of the first arm; and a second telescopic actuator for dynamically adjusting the pivotal positioning of the second arm;

the first telescopic actuator raising and lowering the first arm relative to the body and the second telescopic actuator raising and lowering the second arm relative to the body to change track geometry including raising the first arm and the second arm to lift the first track tensioning wheel and the second track tensioning wheel to reduce the amount of track in ground contact in anticipation of a turn or lowering the first arm and the second arm to increase the amount of track in ground contact in anticipation of travelling on environmentally sensitive ground, or raising one of the first arm or the second arm in anticipation of climbing an obstacle.

* * * * *

UNITED STATES PATENT AND TRADEMARK OFFICE
CERTIFICATE OF CORRECTION

| PATENT NO. | : 7,690,738 B2 |
|---|---|
| APPLICATION NO. | : 11/915844 |
| DATED | : April 6, 2010 |
| INVENTOR(S) | : Wilt |

It is certified that error appears in the above-identified patent and that said Letters Patent is hereby corrected as shown below:

| COLUMN | LINE | ERROR |
|---|---|---|
| Title page Item (57) Pg. 1, col. 2 | Abstract 11 of text | "end of the each" should read --end of each-- |
| Title page Item (57) Pg. 1, col. 2 | Abstract 12 of text | "Dynamically adjustment" should read --Dynamic adjustment-- |

Signed and Sealed this

Seventeenth Day of August, 2010

David J. Kappos
*Director of the United States Patent and Trademark Office*